United States Patent [19]
Schuelke et al.

[11] Patent Number: 6,135,582
[45] Date of Patent: Oct. 24, 2000

[54] COMMUNICATION DEVICE HOUSING INTERCONNECT

[75] Inventors: Aaron M. Schuelke, Sunrise; Wille Kottke, Miami; David Auld, Boynton Beach, all of Fla.

[73] Assignee: Motorola, Inc., Schaumburg, Ill.

[21] Appl. No.: 09/097,575

[22] Filed: Jun. 15, 1998

[51] Int. Cl.[7] ................................................. A47B 97/00
[52] U.S. Cl. ............................................................ 312/223.1
[58] Field of Search .................................. 312/111, 223.1, 312/223.2, 263, 140; 455/127, 348, 349, 90; 361/814, 752; 220/4.33

[56] References Cited

U.S. PATENT DOCUMENTS

| | | | |
|---|---|---|---|
| 4,631,640 | 12/1986 | Umetsu et al. | 361/814 |
| 4,672,510 | 6/1987 | Castner | 361/752 X |
| 4,939,623 | 7/1990 | Equi et al. | 361/752 |
| 5,203,022 | 4/1993 | Finch et al. | 455/127 |
| 5,265,275 | 11/1993 | Goldenberg et al. | 455/349 X |
| 5,369,549 | 11/1994 | Kopp et al. | 312/223.2 X |
| 5,445,450 | 8/1995 | Hayes et al. | 312/223.1 X |
| 5,613,237 | 3/1997 | Bent et al. | 361/814 X |

*Primary Examiner*—Peter M. Cuomo
*Assistant Examiner*—James O. Hansen
*Attorney, Agent, or Firm*—M. Mansour Ghomeshi

[57] ABSTRACT

A portable communication device assembly comprises a first communication device housing (12), a second communication device housing (14), and a snap retainer (40) for interconnecting the housings (12 and 14).

10 Claims, 6 Drawing Sheets

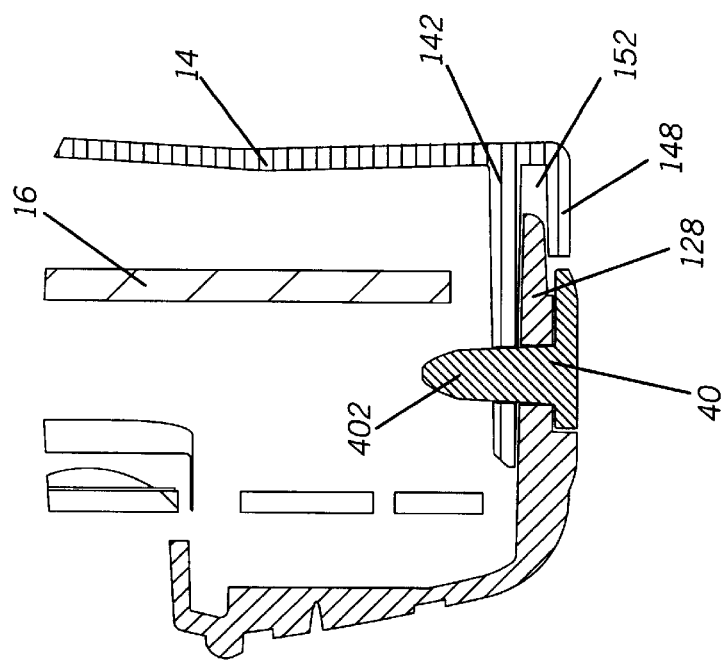
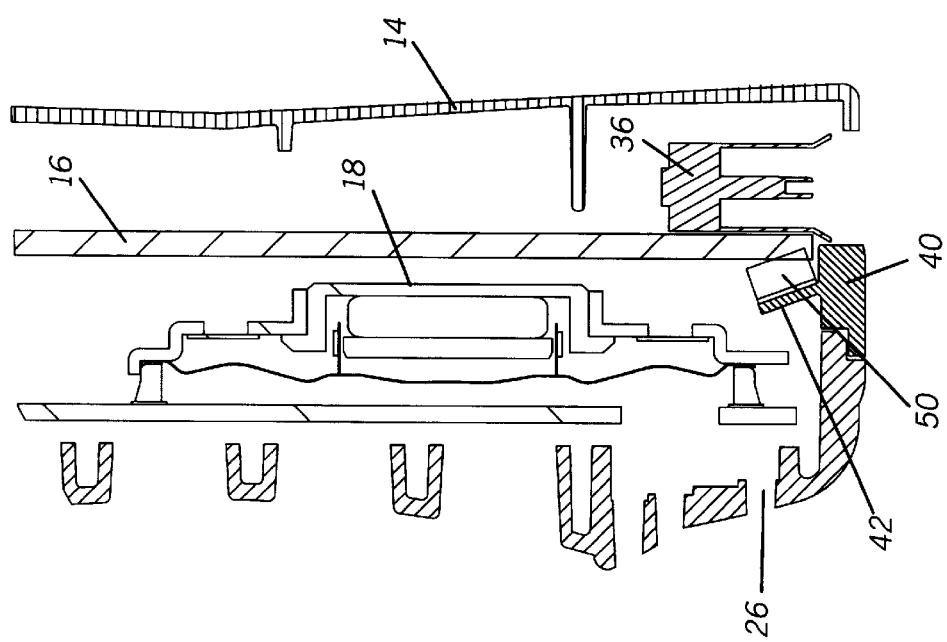
FIG.5
FIG.6

COMMUNICATION DEVICE HOUSING INTERCONNECT

TECHNICAL FIELD

This invention relates generally to the connection between a front communication device housing and a back communication device housing and more specifically to a connection that will also provide acoustic sealing.

BACKGROUND

Battery packs are intended for attachment to and for the energizing of small portable electrical or electronic equipment such as portable communication devices. A two-way radio or phone or a combination thereof is an example of such a communication device. As the communication device grows smaller because of innovation in radio and phone technology, so too does the battery pack such that it is now possible to attach a small battery pack at the back of the two-way radio instead of attaching the battery below the radio, as in traditional two-way radios.

For adding peripheral devices to the communication device as accessories, it is desired have an accessory connector on the communication device. However, as the communication device grows smaller and smaller, the space needed to accommodate a high audio speaker for enhanced audio performance and the accessory connector, along with other radio and/or telephone components converges to a tight space constraint at the bottom of the radio and/or phone combination.

To ensure that the communication device provides enhanced audio porting even in a small housing which is providing an opening for the accessory connector, there is a need to design a housing retainer that can be robustly attached and locked into the proper position on the housing without enabling audio leaking through the accessory connector opening.

Therefore, a space efficient method is needed to retain the front and back radio housings together while maintaining mechanical and audio integrity through product use and abuse.

BRIEF DESCRIPTION OF THE DRAWINGS

FIG. 5 is a cross-sectional view of the communication device 10 with the retainer 40 attached and cut across the sectional lines 5—5 of FIG. 4 to show the ledge position;

FIG. 6 is a cross-sectional view of the communication device 10 with the retainer 40 attached and cut across the sectional lines 6—6 of FIG. 4 to show the pin insertion;

DETAILED DESCRIPTION OF THE PREFERRED EMBODIMENT

Figure 1:
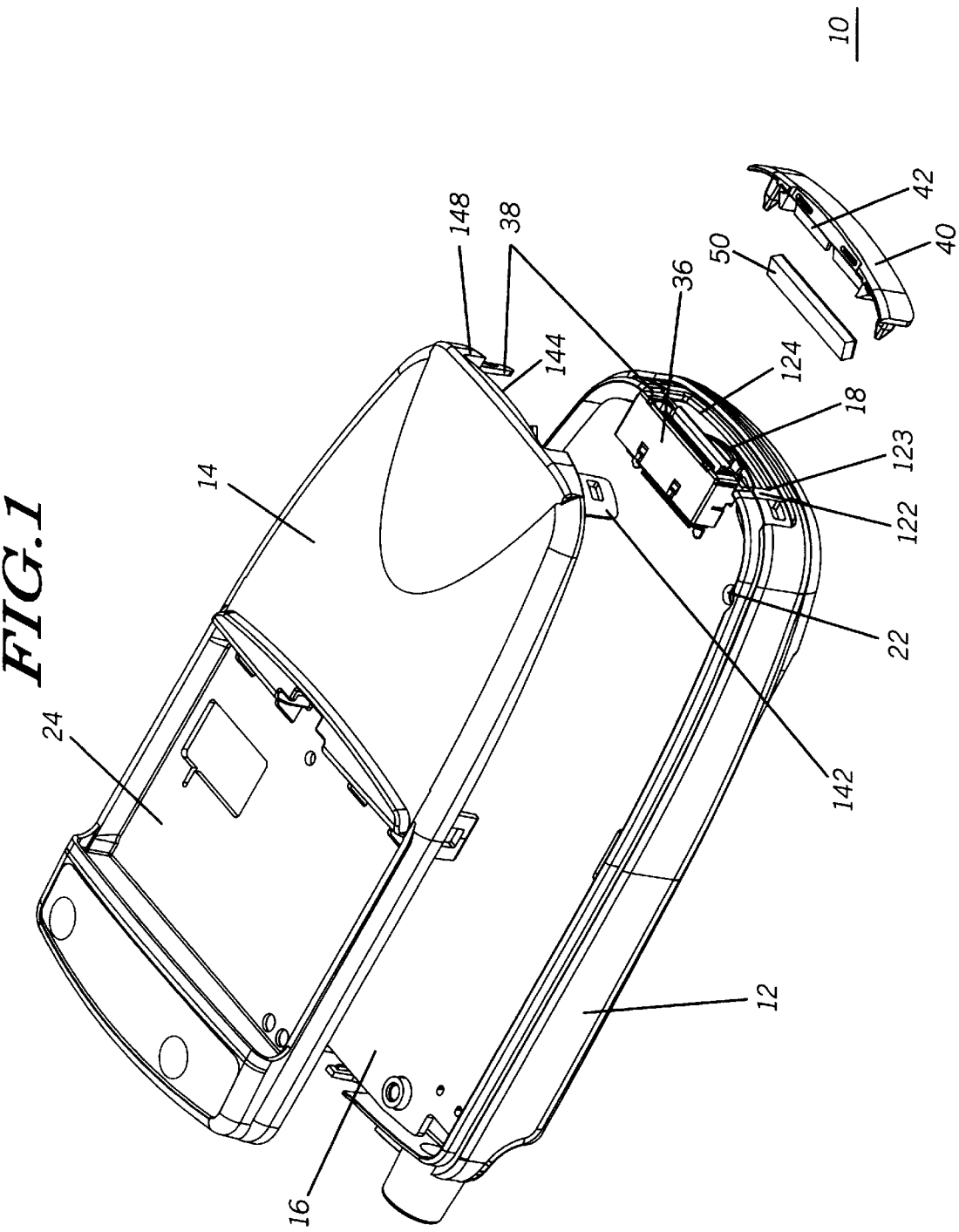
FIG. 1 is a perspective view of a communication device in accordance with the present invention.
Figure 2:
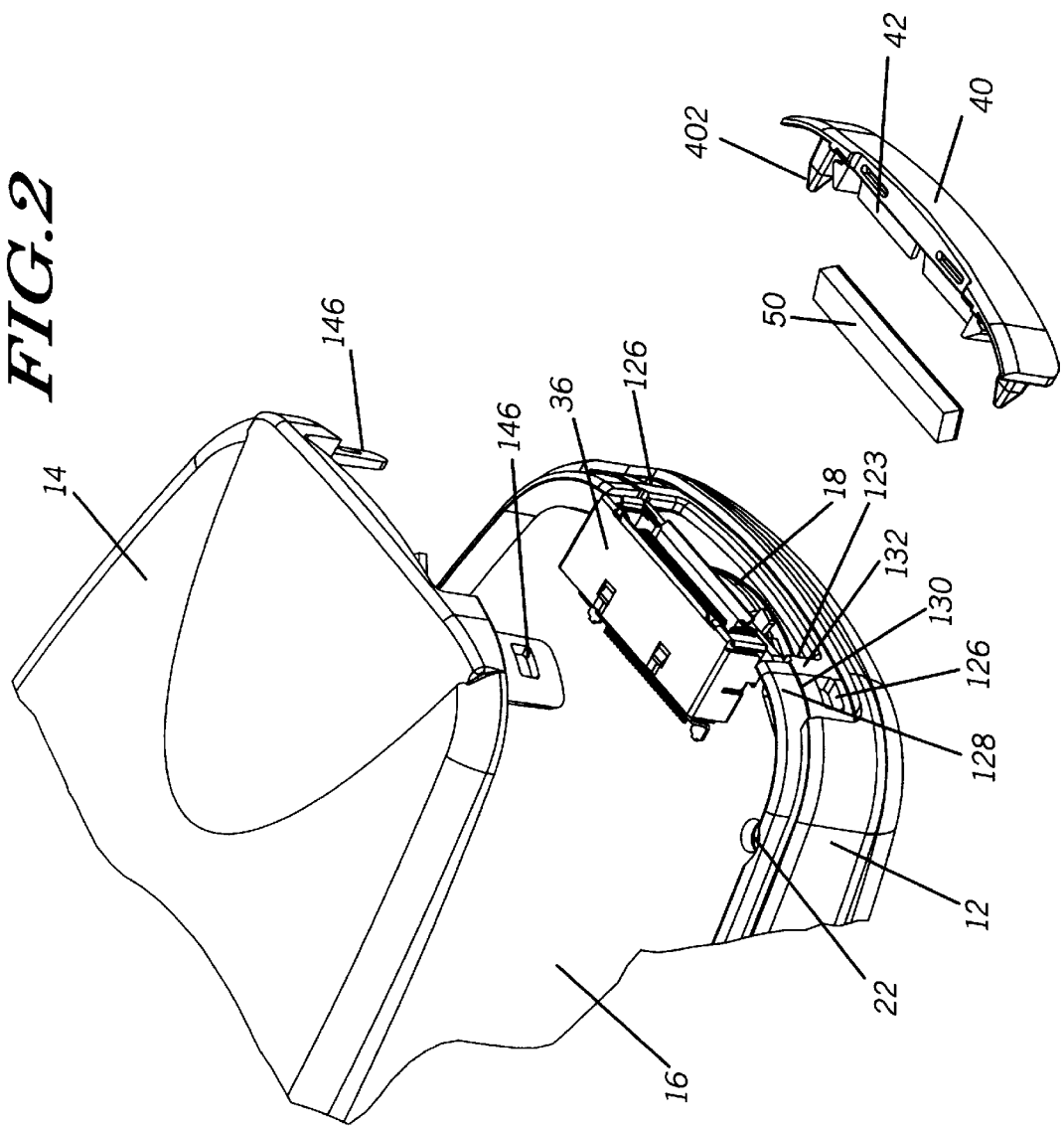
FIG. 2 is a partial blown-up view of the communication device of FIG. 1 showing the interrelationship between the two halves of the housing and the retainer.
Figure 3:
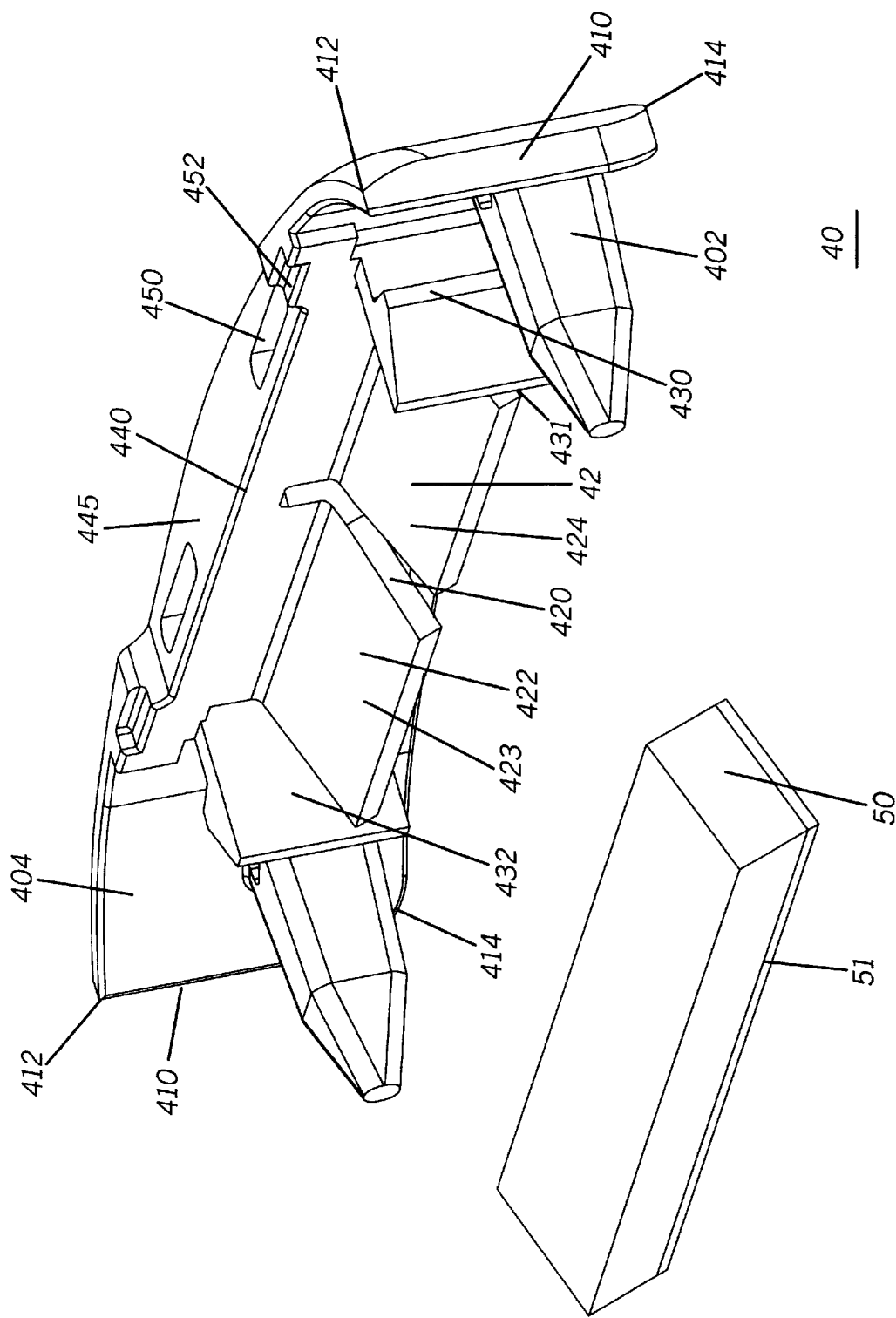
FIG. 3 is a perspective view of the retainer 40 with a gasket 50 of FIG. 1.
Figure 4:
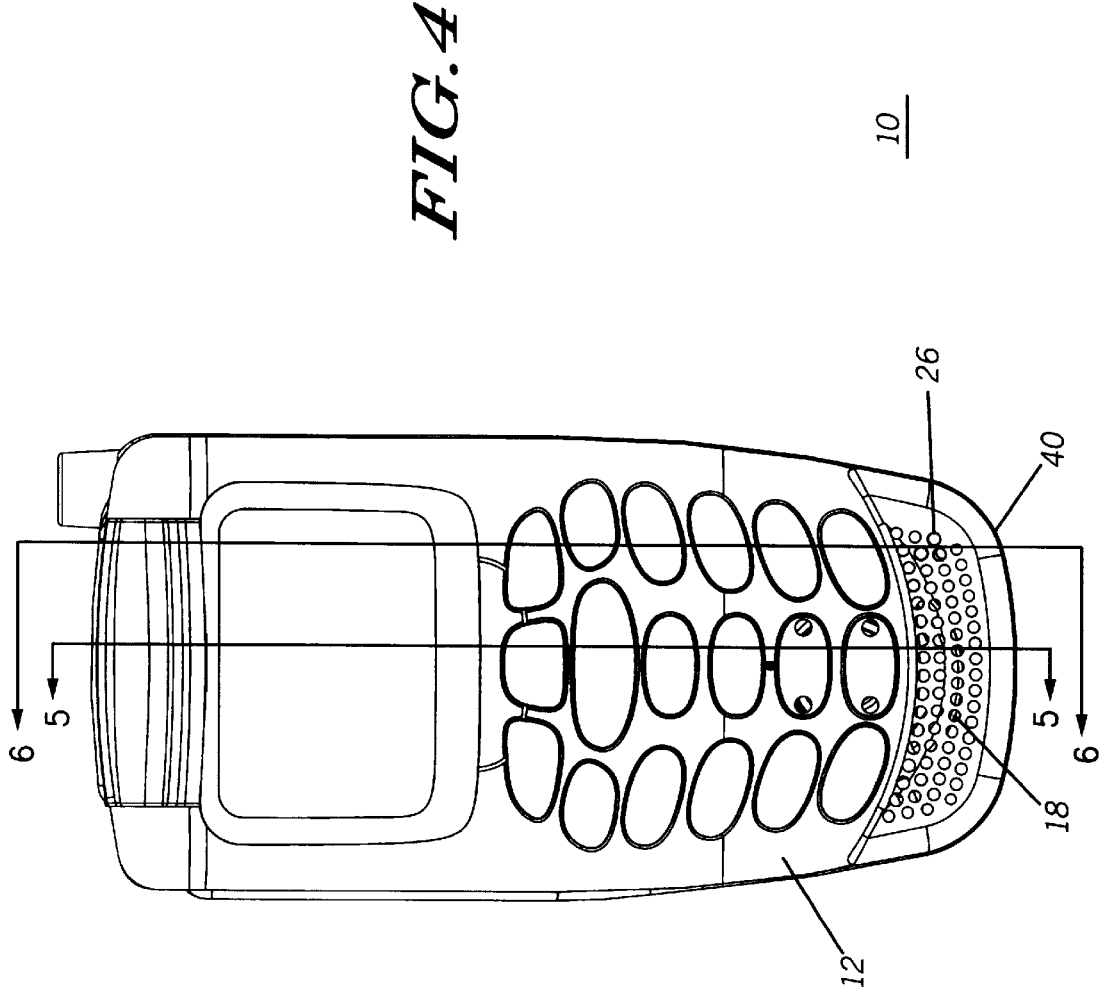
FIG. 4 is a top view of the communication device of FIG. 1 with the retainer 40 attached, in accordance with the present invention.

Referring to FIGS. 1 and 2, a battery powered portable communication device 10 is provided including two housings 12 and 14, and a snap retainer 40 attachable to one or both of the housings 12 and 14. In FIG. 3, a perspective view of the inventive retainer 40 of FIG. 1 for retaining the housings of the communication device 10 is shown. A cross-sectional view taken along lines 5—5 and 6—6 of the front view of the communication device 10 of FIG. 4 with the retainer 40 and interconnected is shown in the cross-sectional views of FIG. 5 and FIG. 6, respectively.

Referring to FIGS. 1–6, in this case, the portable device is the two-way portable communication device transceiver 10 that can be used as a phone with a flip attached in a clam-shell configuration. The communication device 10 has a communication device first housing 12 which can be the front housing containing a printed-circuit (PC) board 16. The PC board 16 holds the operating electrical/electronic circuitry and associated components, including a high audio speaker 18, and is supported by support posts 22 of the first housing 12 at a level, substantially referred to as the seam line of the communication device. Such communication device circuitry is energized by a suitable power source when interconnected to supply terminals in a battery housing (not shown) which includes the battery power source that is mounted in a battery cavity 24 on the back of the communication device's second or back housing 14.

In order to achieve good high audio performance in a small portable communication device, audio leak paths from the high audio speaker 18 mounted on the PC board 16, placed behind an audio grille 26 of the first housing 12 to the outside of the radio, as via an accessory connector 36 access framed by openings of both housings need to be reduced or eliminated. The accessory connector opening 38 is located at the bottom of the communication device 10 above or otherwise near the loud or enhanced audio speaker 18. The close proximity to the speaker 18 makes sealing this area critical for stopping audio leak paths. Because of the small size of the front or first housing 12 area near the accessory connector opening 38, a sealing feature can not be accommodated on the housings 12 and 14 themselves nor on the PC board 16. The audio grille 26 on the first housing 12 maximizes the number of apertures to create sufficient speaker porting in a slightly rounded and "U" shaped cavity at the bottom of the first housing 12. The complex tooling that creates this grille 26 and cavity renders it difficult to implement an undercut in the plastic tooling to provide a surface to seal against a printed circuit (PC) board 16 near the accessory connector 36 and its opening 38. An additional housing part, in the form of a snap retainer 40 is taught by the present invention to create a ledge 42 for an audio seal gasket 50 and to pin or otherwise lock the two halves 12 and 14 of the housing together.

The first communication device housing 12 has a tiered edge 122 surrounding a first opening 124. For receiving the tiered edge 122, the second communication device housing 14 has a pair of recessed extensions 142 surrounding a second opening 144 such that the tiered edge 122 of the first communication device housing 12 overlaps the pair of recessed extensions 142 of the second communication device housing 14. The second opening 144 forms a composite larger third opening when not overlapped, but completes a smaller accessory opening above and access for the retainer below, when the second opening is overlapped with the first opening. This third opening is covered by the retainer 40 at the first opening portion while the second opening portion is accessible for the accessory connector 36. For mating these two housings together, the snap retainer 40 interconnects the first 12 and second 14 housings at the tiered edge 122 and the recessed extension 142. For reducing audio leaks, the snap retainer has the ledge or shelf 42 for separating the first opening from the second opening.

Many protruding variations on the retainer and corresponding receiving features of the composite receptacle of the combined housings can be envisioned by the teachings of the present invention. As long as at least one protruding member of the retainer is integrally mounted on the body of the retainer, containing the ledge, for mating with a corresponding receiving receptacle formed by the two housings, the ledge can cover a portion of the corresponding receptacle while the at least one protruding member is snapped into the corresponding receiving receptacle for reducing audio leaks and providing accessory access.

For example, to form a suitable receiving receptacle, each of the first 12 and second 14 housings preferably includes at least one window opening 126 or 146. The bottom of a recessed rim 128 of the tiered edge 122 of the first housing is located about the level that the bottom of the PC board 16 is supported by the PC board posts 22 and forms the seam line 130 of the communication device housing. The portion of the first opening above the recessed rim 128, or more precisely above the seam 130, overlaps with the second opening to form the accessory connector opening. Below this recessed rim 128 is a slightly less recessed corner side-wall 132 of the front housing 12 for helping to form the tiered edge 122. Preferably, a rectangular window opening 126 sits within this corner side-wall 132. The recessed extension 142, forming a tab, on the second or back housing 14 has a corresponding window 146 on the extension 142. The extension 142 is recessed behind an overhang 148 where a channel or groove 152 separates the overhang 148 and the extension 142. The second communication device housing 14 includes this groove 152 to form a rail behind the recessed extensions 142 to channel the housings 12 and 14 together. This groove or rail 152 then assist in overlapping and aligning the two housings around the seam 130. The overhang 148 covers the recessed rim 128 above the PC board 16 level or seam line 130 and is stopped by the corner side-wall 122 where the recessed rim 128 fits within the groove 152 behind the second housing 14. After the housings 12 and 14 are thus aligned, the snap retainer 40 has at least one post or pin 402 for locking-in the first 12 and second 14 housings through the overlapped pair of window openings 126 and 146. For easier insertion, the post is preferably angled or tapered for forming a point at the end. The housings 12 and 14 can pull together more tightly as the pin or pins 402 are fully inserted when the pins 402 are tapered. For better balance and support, two opposed posts or pins 402 are formed on the retainer 40 to form a substantially elongated "U" shaped clip. The first housing 12 is thus vertically connected to the second housing and the "U" shaped snap retainer slides over both of the housings to complete a locked connection. When assembled, the windows 126 and 146 overlap each other and the pair of posts or pins 402 on the retainer 40 slide through the overlapped window openings 126 and 146 interlocking the two housings 12 and 14 together. Since the retainer 40 is assembled normal to the housing assembly direction, any force trying to separate the housings will load the posts or pins 402 in shear, rendering the retainer 40 less susceptible to disengagement during shock or other stress conditions.

To provide a resilient clip or snap retainer of the present invention, the retainer is made of a polycarbonate material and in a curved beam shape 404 having two free opposed ends 410. The posts 402 are integrally formed near but away from these free opposed ends 410. For proper alignment of the seam, the straight corner end 412 of the beam at the two opposed corners closest to the rim or seam of the first housing has more straight edges than the two lowered opposed curved corners 414 closest to the windows.

For reducing audio leakage while providing access to the accessory opening, the ledge 42 of the retainer 40 is perpendicularly integrally mounted between the two free opposed ends 410. To provide additional flexibility or snappiness to the retainer 40 the ledge 42 includes a notch 420 at the middle. Additionally, the retainer 40 includes at least one hook 430 near the end of the ledge 42. The hook 430 is optionally "J"-shaped for retaining an edge 123 of the corner side-wall 122 that is framing the window 126 and for forming a snap feature. Furthermore, a center projecting rim 440 on the retainer 40, not as long as the ledge 42, along with the top edge 431 of the hook 430, help support or position the PC board 16. The center projecting rim 440 optionally drops down slightly at the center 445 above the ledge 42 to accommodate two disassembly slots 450 and to align with the seam 130 of the housings. Furthermore, two optional corner notches 452 are cut-away near the seam line 130 between the perpendicular intersection of the slightly curved beam 404 and the dropped-down center projecting rim 440 to accommodate the accessory connector 36.

Since the retainer 40, including the posts 402, is designed to be extremely robust so that the retainer 40 does not disassemble during drops, the retainer 40 might be difficult to disassemble without forcing the housings apart in a manner that could damage one of the housings 12 or 14 or the retainer 40 itself. Hence, the two small disassembly slots or holes 450 are optionally provided into the center projecting rim 440 that is perpendicularly connected to the first beam 404 of the retainer 40. These holes 450 allow a service technician to insert a simple tool, such as a screw driver, that pries the retainer 40 back out against the housings 12 and 14 by pressing down against each of the separated sides 422 and 424 of the ledge 42 between the center notch 420 of the ledge 42.

For ease of assembly, the ledge 42 is preferably angled or sloped down inwardly from the center projecting rim 440. The resultant area formed in-between the center projection rim 440, the downward sloping ledge 42 and the straight side 432 of a preferable pair of J-shaped hooks 430 allows the rectangular sealing gasket 50 to be adhesively (51) applied on this sloped down surface 423 for improved audio sealing. Hence, the ledge 42 fits securely into the front housing 12, with the back housing 14 overlapped and fastened behind and provides an audio shelf for the audio sealing gasket 50. This gasket 50 supported on the shelf 42 then snugly fits below the PC board 16 to mechanically and audiowise mount the housings 12 and 14 together with robust integrity. Because the assembly direction of the retainer 40 is normal to the housing assembly direction in this exemplary retainer embodiment, the seal to the underside of the PC board 16 is difficult. The ledge 42 on which the gasket 50 is placed is therefore angled so that the gasket 50 still compresses even when the retainer 40 is inserted normal to the sealing direction to provide the necessary acoustic sealing.

Figure 8:
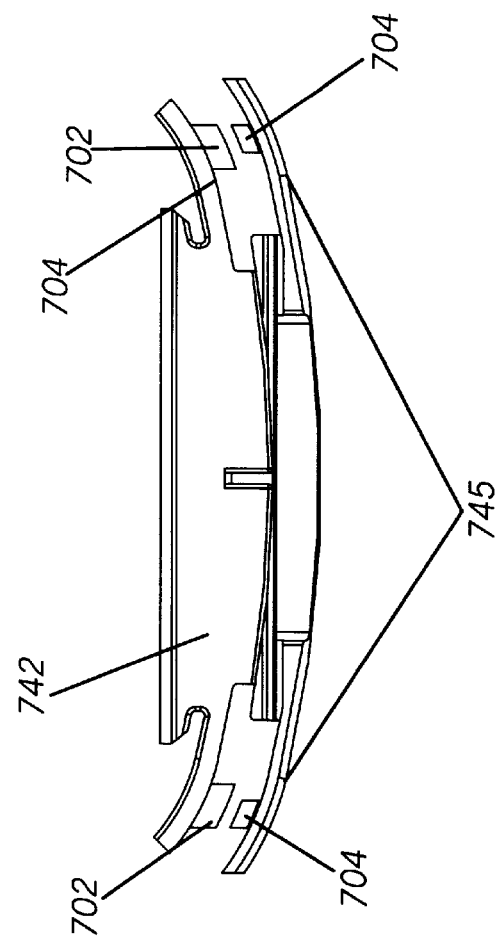
FIG. 8 is a top view of the retainer 740 of FIG. 7.
Figure 7:
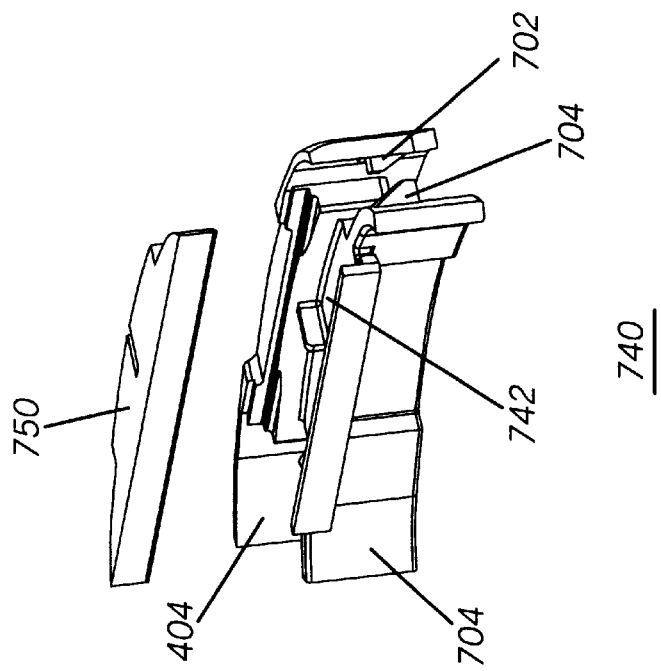
FIG. 7 is a perspective view of another embodiment of the retainer, in accordance with the present invention.

Referring to FIGS. 7 and 8, other variations of the additional retainer can be implemented. Instead of the Y-directional assembly where the ledge is assembled normal to the housing assembly, all housings and retainer can be assembled in the Z-direction. The protruding members of a Z retainer 740 can include a second slightly curved beam 704 with angled snapping features or tapered stubs 702 and 704 on the opposed surfaces of the two beams 704 and 404 for snappingly inserting them through the windows. The first pair of stubs 704 on the first beam 404 of the Z-retainer 740 snaps onto the windows of the front housing where the PC board is also screwed or otherwise assembled onto the front housing, again compressing a corresponding acoustic pad 750 onto a cornered ledge 742 to create the acoustic seal. The back housing is then assembled in the same Z-direction and the two windows snap into the second pair of stubs 702 on the second beam 704. The cornered ledge 742 thus successfully creating the necessary audio seal while holding the back housing onto the communication device. Since the stubs 702 and 704 are designed to be extremely robust so that the Z-retainer 740 does not disassemble during drops, the retainer 740 might be difficult to disassemble without forcing the housings apart in a manner that could damage one of the housings or the retainer 740 itself. Hence, two small disassembly holes 745 are formed into external side of the first beam of the retainer. These holes 745 allow a service technician to insert a simple tool that pushes onto the stubs 702 and 704 that hold the back housing in. This push or press of the second beam 704 containing the stub 702 disengages the stub 702 to allow the back housing to be removed. Once the back housing is removed, the PC board and the retainer can also be easily detached for servicing.

What is claimed is:

1. A portable communication device assembly, comprising:
   a first communication device housing having a tiered edge surrounding a first opening;
   a high audio speaker located in the first communication device housing;
   a second communication device housing having a pair of recessed extensions surrounding a second opening, the tiered edge of the first communication device housing overlapping the pair of recessed extensions of the second communication device housing and the second opening forms a composite third opening with the first opening; and
   a snap retainer for interconnecting the first and second housings at the tiered edge and the pair of recessed extensions, the snap retainer having a ledge for separating the first opening from the second opening in order to reduce audio leaks generated by the high audio speaker.

2. The portable communication device assembly of claim 1, wherein
   each of the first and second housings includes at least one window opening; and
   the snap retainer engages the at least one window opening for interconnecting the housings.

3. The portable communication device assembly of claim 2 wherein the snap retainer includes at least one post for locking in the first and second housings through the at least one window opening.

4. The portable communication device assembly of claim 2 wherein the retainer includes at least one hook for retaining an edge of the at least one window opening.

5. The portable communication device assembly of claim 1 wherein the ledge includes a notch to provide flexibility to the retainer.

6. The portable communication device assembly of claim 1 wherein the second communication device housing includes a rail behind the recessed extensions to channel the housings together.

7. The portable communication device assembly of claim 1 wherein the snap retainer comprises a substantially elongated "U" shaped clip.

8. The portable communication device assembly of claim 1, wherein the first housing is vertically connected to the second housing and the snap retainer slides over both of the housings to complete a locked connection.

9. A communication device, comprising:
   a first housing section having a first opening;
   a high audio speaker located on the first housing section;
   a second housing section having at least one recessed extension surrounding a second opening, the second housing section being attached to the first housing section via the at least one recessed extension whereby the first and second openings couple to form a third opening; and
   a retainer for interconnecting the first and second housings and to reduce audio leaks generated by the high audio speaker, the retainer including:
     a curved beam having two free opposed ends;
     a ledge perpendicularly integrally mounted between the two fixed opposed ends; and
     at least one protruding member integrally mounted on the curved beam for mating with a corresponding receiving receptacle such that the ledge covers apportion of the corresponding receptacle and the at least one protruding member is snapped into the corresponding receiving receptacle.

10. A portable communication device assembly, comprising:
    a first communication device housing having a tiered edge surrounding a first opening;
    a high audio speaker located in the first communication device housing;
    a second communication device housing having a pair of recessed extensions surrounding a second opening, the tiered edge of the first communication device housing overlapping the pair of recessed extensions of the second communication device housing and the second opening forms a composite third opening with the first opening;
    a snap retainer for interconnecting the first and second housings at the tiered edge and the pair of recessed extensions, the snap retainer having a ledge for separating the first opening from the second opening in order to reduce audio leaks generated by the high audio speaker; and
    the snap retainer including:
      a curved beam having two free opposed ends and a center projecting rim;
      a ledge perpendicularly integrally mounted between the two free opposed ends and the ledge extending beyond the center projecting rim for acoustic sealing the communication device; and
      at least one protruding member integrally mounted on the curved beam for mating with a corresponding receiving receptacle such that the ledge covers a portion of the corresponding receptacle and the at least one protruding member is snapped into the corresponding receiving receptacle.

* * * * *